United States Patent [19]

Quick et al.

[11] Patent Number: 4,525,150
[45] Date of Patent: Jun. 25, 1985

[54] BELT PULLEY AND METHOD OF MAKING THE SAME

[75] Inventors: Terrence R. Quick; Paul M. Standley; Mark P. Foley, all of Springfield; Anderson W. Howerton, Christian County; Joseph P. Miranti, Jr., Porter Township, Christian County; Larry R. Oliver; Gerald C. Holloway, Jr., both of Springfield; Kenneth D. Richmond, Garden Grove Township, Christian County, all of Mo.

[73] Assignee: Dayco Corporation, Dayton, Ohio

[21] Appl. No.: 413,031

[22] Filed: Aug. 30, 1982

[51] Int. Cl.³ ............................................. F16H 57/04
[52] U.S. Cl. ...................................... 474/93; 474/166
[58] Field of Search ........................ 474/93, 178, 166; 198/835

[56] References Cited

U.S. PATENT DOCUMENTS

| 334,998 | 1/1886 | Wardwell | 474/178 |
| 1,993,547 | 3/1935 | Heyer | 474/93 X |
| 2,550,223 | 4/1951 | Carlin et al. | 474/93 X |
| 3,659,471 | 5/1972 | Marsch | 474/93 |
| 4,422,498 | 12/1983 | Chen | 474/93 X |

FOREIGN PATENT DOCUMENTS 1068168 5/1967 United Kingdom .................. 474/93

Primary Examiner—James A. Leppink
Assistant Examiner—Frank H. McKenzie, Jr.
Attorney, Agent, or Firm—Joseph V. Tassone

[57] ABSTRACT

A belt pulley and method of making the same are provided, the pulley having a hub and a peripheral groove for receiving part of an endless belt therein that is to drive the pulley or be driven thereby whereby the pulley is adapted to be rotated about a longitudinal axis of the hub. The pulley has a pair of opposed facing sides defining at least part of the groove therebetween and has a pair of oppositely facing outboard sides, the sides each having an inner peripheral portion and an outer peripheral portion. The pulley has a plurality of circumferentially spaced apart and radially disposed substantially straight vanes extending outwardly from at least one of the outboard sides thereof. Each vane has an inner peripheral end and an outer peripheral end respectively disposed adjacent the inner peripheral portion and the outer peripheral portion of its respective outboard side and has an outer edge that is disposed substantially transverse to the longitudinal axis of the hub from substantially the inner peripheral end thereof to the outer peripheral end thereof and is spaced outwardly from the respective outboard side from substantially the inner peripheral end thereof to the outer peripheral end thereof whereby the vanes are adapted to act on fluid adjacent to pulley to tend to cool the pulley with the fluid.

10 Claims, 15 Drawing Figures

BELT PULLEY AND METHOD OF MAKING THE SAME

BACKGROUND OF THE INVENTION

1. Field of the Invention

This invention relates to an improved belt pulley and to a method of making such a belt pulley or the like.

2. Prior Art Statement

It is known to provide a belt pulley having a hub and a peripheral groove for receiving part of an endless belt therein that is to drive the pulley or be driven thereby whereby the pulley is adapted to be rotated about a longitudinal axis of the hub, the pulley having a pair of opposed facing sides defining at least part of the groove therebetween and having a pair of oppositely facing outboard sides. The sides each have an inner peripheral portion and an outer peripheral portion, the pulley having a plurality of circumferentially spaced apart and radially disposed substantially straight vanes extending outwardly from at least one of the outboard sides thereof.

For example, see the U.S. Pat. No. 1,993,547, to Heyer; the U.S. Pat. No. 2,550,223, to Carlin et al; the U.S. Pat. No. 3,659,471, to Marsch; the U.S. Pat. No. 4,422,498, to Chen and the British Pat. No. 1,068,168, to Schloz et al.

SUMMARY OF THE INVENTION

It is one feature of this invention to provide a belt pulley having improved means for cooling the same.

In particular, it is well known that a major problem in belt driven systems is the heat that is dissipated through hysteresis and friction and that this heat generation can cause glazing on the belt sides and failure of the belt. This is particularly a problem in high ratio or high load drives, including vehicle drives such as continuously variable transmissions, automotive accessory drives, industrial type drives, etc., because the belt life is limited largely by belt operating temperature.

It was found according to the teachings of this invention that if the belt pulley has a plurality of vanes or fins on at least one outboard side thereof and formed in a manner hereinafter set forth, the vanes will not only provide increased surface area for cooling purposes, but also the vanes when rotated will cause turbulence in the air flow adjacent the pulley, both features increasing the heat transfer out of the pulley. Also, circulation of the air by the rotating vanes causes flow of the air not only over the pulley surfaces, but also causes air flow over the belt in the free span which helps to lower the belt temperature. In this manner, it is believed that the life of the belt being utilized with the pulley of this invention will be extended.

For example, one embodiment of this invention provides a belt pulley having a hub and a peripheral groove for receiving part of an endless belt therein that is to drive the pulley or be driven thereby whereby the pulley is adapted to be rotated about a longitudinal axis of the hub, the pulley having a pair of opposed facing sides defining at least part of the groove therebetween and having a pair of oppositely facing outboard sides. The sides each have an inner peripheral portion and an outer peripheral portion. The pulley has a plurality of circumferentially spaced apart and radially disposed straight vanes extending outwardly from the outboard sides thereof. Each vane has an inner peripheral end and an outer peripheral end respectively disposed adjacent the inner peripheral portion and the outer peripheral portion of its respective outboard side and has an outer edge that is disposed substantially transverse to the longitudinal axis of the hub from substantially the inner peripheral end thereof to the outer peripheral end thereof and is spaced outwardly from the respective outboard side from substantially the inner peripheral end thereof to the outer peripheral end thereof whereby the vanes are adapted to act on fluid adjacent the pulley to tend to cool the pulley with the fluid. A pair of plate means respectively carry the vanes for the outboard sides of the pulley and are respectively secured to the outboard sides of the pulley to rotate in unison therewith, each plate means having part of the hub carried thereby and being secured to the part of the hub of the other plate means whereby the parts define the hub of the pulley.

Accordingly, it is an object of this invention to provide an improved belt pulley having one or more of the novel features of this invention as set forth above or hereinafter shown or described.

Another object of this invention is to provide an improved method of making such a belt pulley, the method of this invention having one or more of the novel features of this invention as set forth above or hereinafter shown or described.

Other objects, uses and advantages of this invention are apparent from a reading of this description which proceeds with the reference to the accompanying drawings forming a part thereof and wherein:

DESCRIPTION OF THE PREFERRED EMBODIMENTS

Figure 1:
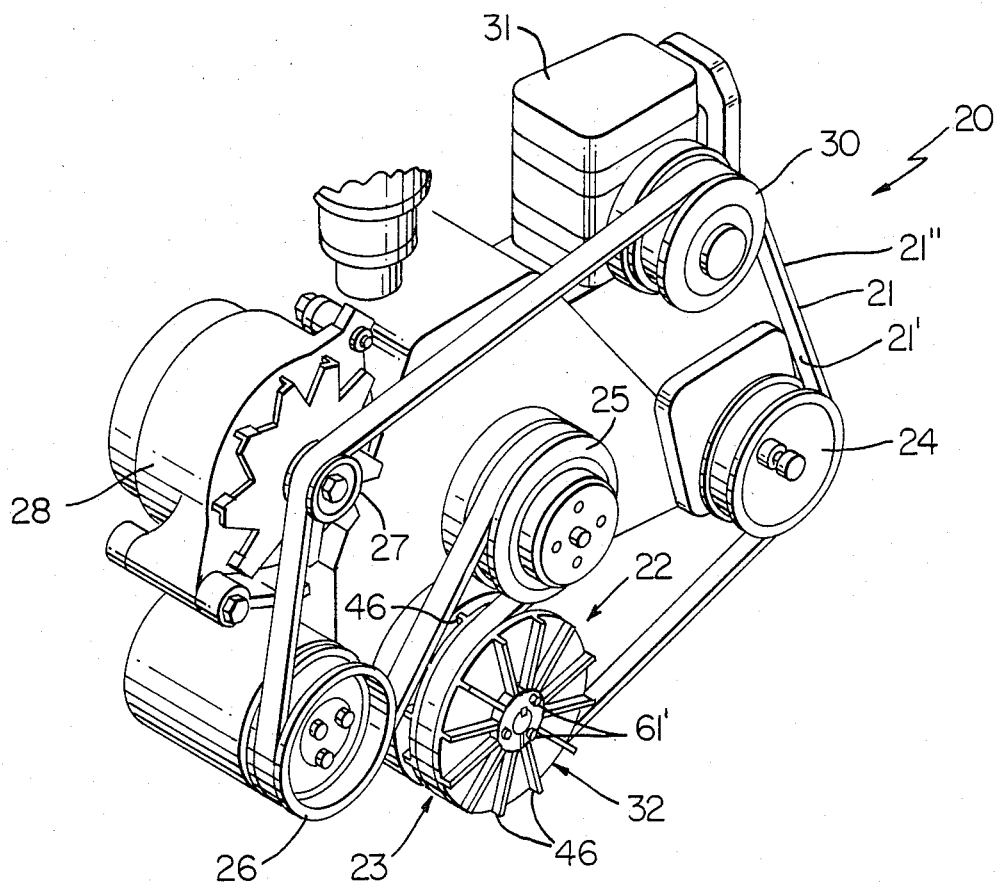
FIG. 1 is a fragmentary, isometric view looking toward the front end of an automotive engine which is adapted to utilize one of the pulleys of this invention, FIG. 1 illustrating one pulley of this invention.

While the various features of this invention are hereinafter illustrated and described as providing a belt pulley for a particular motor vehicle engine, it is to be understood that the various features of this invention can be utilized singly or in any combination thereof to provide the belt pulley for other belt systems as desired, such as the belt systems previously mentioned.

Therefore, this invention is not to be limited to only the embodiments illustrated in the drawings, because the drawings are merely utilized to illustrate one of the wide variety of uses of this invention.

Figure 2:
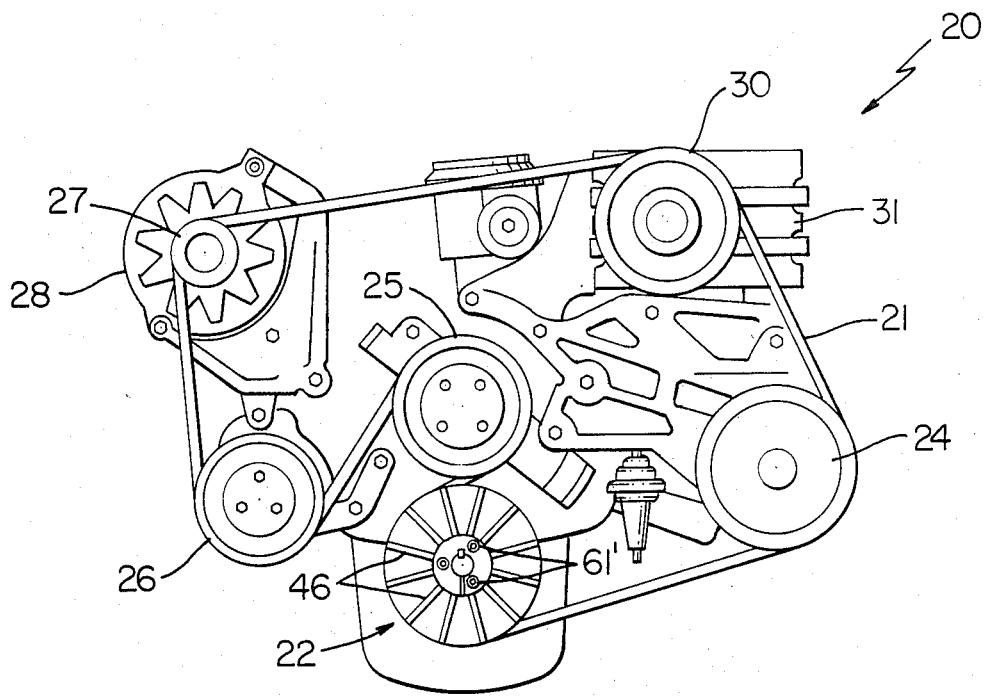
FIG. 2 is a view looking perpendicularly towards the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, one of the improved pulleys of this invention being generally indicated by the reference numeral 22 in FIGS. 3–6, as well as FIGS. 1 and 2, and being adapted to provide a cooling effect on the belt 21 in a manner hereinafter set forth.

The endless power transmission belt 21 may be of any suitable type known in the art and is preferably made primarily of a polymeric material. The belt 21 in FIGS. 1 and 2 is of a generally rectangular cross-sectional configuration and has a bottom driving surface 21' and a top driving surface 21'' in a manner well known in the art, the belt 21 being ribbed or non-ribbed as desired.

However, it is to be understood that the various features of this invention as hereinafter set forth are adapted to operate on belt constructions having other cross-sectional configurations whereby the pulleys of this invention illustrated in FIGS. 3–15 are illustrated as providing pulleys for belts that have a generally trapezoidal cross-sectional configuration as is well known for V-belt constructions with the understanding that the pulleys of this invention can be modified in a manner well known in the art to operate on belts of other cross-sectional configurations as desired.

The belt 21 is driven by a conventional pulley portion 23 of the pulley 22 of this invention which is operatively interconnected to the crankshaft of the engine 20 in a manner well known in the art whereby the pulley 22 is a driven sheave or pulley. The driving pulley 22 drives the belt 21 in an endless path and thereby drives a sheave or pulley 24 of a power steering device used in an automobile (not shown) utilizing the engine 20, a sheave or pulley 25 of an engine water pump, a sheave or pulley 26 of an air pump of the type used in an anti-pollution system for the engine 20, a sheave or pulley 27 of an engine electrical alternator 28 and a sheave or pulley 30 of a compressor 31 of an air conditioning system for the automobile utilizing the engine 20. All of the driven accessories, through their sheaves or pulleys 24, 25, 26, 27 and 30 impose a load on the belt 21 as is well known in the art whereby the same impose a heating load to the belt 21, the driving pulley 22 and engine 20 also imposing a heating load to the belt 21 as is well known in the art.

As previously stated, it is one feature of this invention to provide the pulley 22 with improved means that tend to cool the belt 21 during its operation and thereby extend its belt life.

In particular, the pulley 22 as illustrated in the drawings comprises the combination of the conventional pulley portion 23 and cooling vane or fin means that are generally indicated by the reference numeral 32 in the drawings and are believed to create fluid flow not only over the adjacent surfaces of the pulley portion 23, but also over the belt 21 in the free span thereof to help lower the belt temperature during the operation of the engine 20 as will be apparent hereinafter.

The pulley portion 23 of the pulley 22 of this invention as illustrated in FIGS. 3–6 comprises a hub 33 and a pair of pulley parts or sheaves 34 and 35 secured together in a manner hereinafter set forth to define a peripheral groove 36 between a pair of opposed facing sides 37 of the respective pulley parts 34 and 35 for receiving part of the endless belt 38 therein that is to drive the pulley 22 through engagement of the opposed sides 39 of the belt 38 with the facing sides 37 of the pulley 22 or to be driven by the pulley 22 through rotation of the pulley 22 in any suitable manner, such as by the crankshaft of the engine 20 previously described.

The pulley parts 34 and 35 respectively have a pair of oppositely facing outboard sides 40 which are substantially flat and are disposed substantially transverse to the longitudinal axis 41 of the hub 33 of the pulley 22, the sides 37 being inclined relative to the axis 41 in order to engage the angled sides 39 of the belt 38.

The sides 37 and 40 of the pulley 22 respectively have inner peripheral portions 42 and 43 and outer peripheral portions 44 and 45.

The vane means 32 of the pulley 22 of this invention comprise a plurality of circumferentially spaced apart and radially disposed substantially straight vanes or fins 46 extending outwardly from the outboard sides 40 of the pulley parts 34 and 35, each vane 46 having an inner peripheral end 47 and an outer peripheral end 48 respectively disposed adjacent the inner peripheral portion 43 and outer peripheral portion 45 of its respective outboard side 40 and having an outer edge 49 that is disposed substantially transverse to the longitudinal axis 41 of the hub 33 from substantially the inner peripheral end 47 thereof to the outer peripheral end 48 thereof and that is spaced outwardly from the respective outboard side 40 from substantially the inner peripheral end 47 thereof to the outer peripheral end 48 thereof whereby the vanes 46 are adapted to act on fluid adjacent the pulley 22 to tend to cool the pulley 22 with the fluid as well as to direct the fluid onto belt 38 in the span thereof adjacent the outer peripheral portion 44, 45 of the pulley halves or parts 34 and 35.

The vanes 46 of the pulley 22 are integral and one-piece with the respective pulley half 34 or 35 whereby the pulley halves or parts 34 and 35 can be respectively formed of material which readily conducts heat so as to transfer heat from the belt 38 as well as from the inner surfaces 37 of the pulley halves 34 and 35 to the outboard surfaces 40 and the fins or vanes 46 to dissipate such heat to the air adjacent the surfaces 40 through the large surface areas provided by the surfaces 40 and the surfaces of the vanes 46. For example, the pulley halves 34 and 35 with their vanes 46 can be formed of suitable metallic containing material in any suitable manner, such as by casting, etc.

Figure 4:
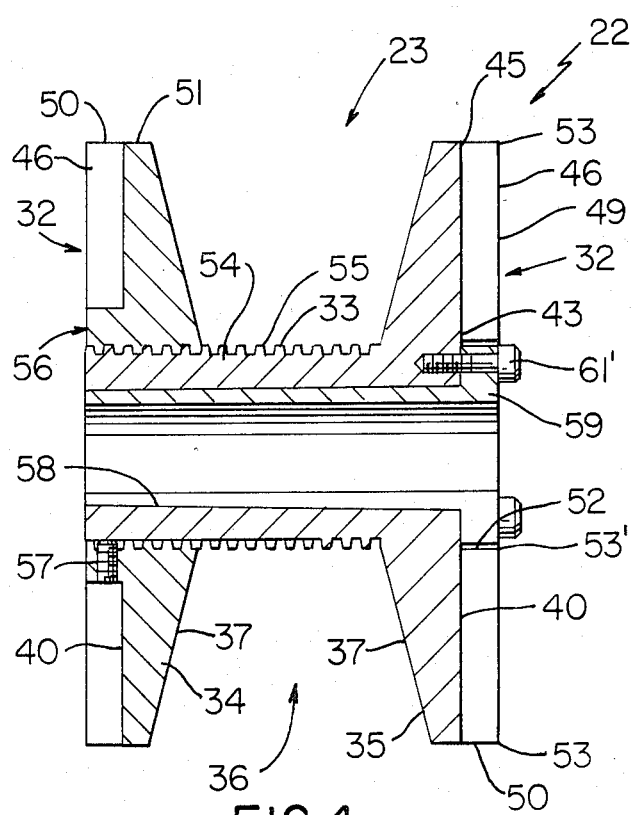
FIG. 4 is a cross-sectional view taken on line 4—4 of FIG. 3.
Figure 6:
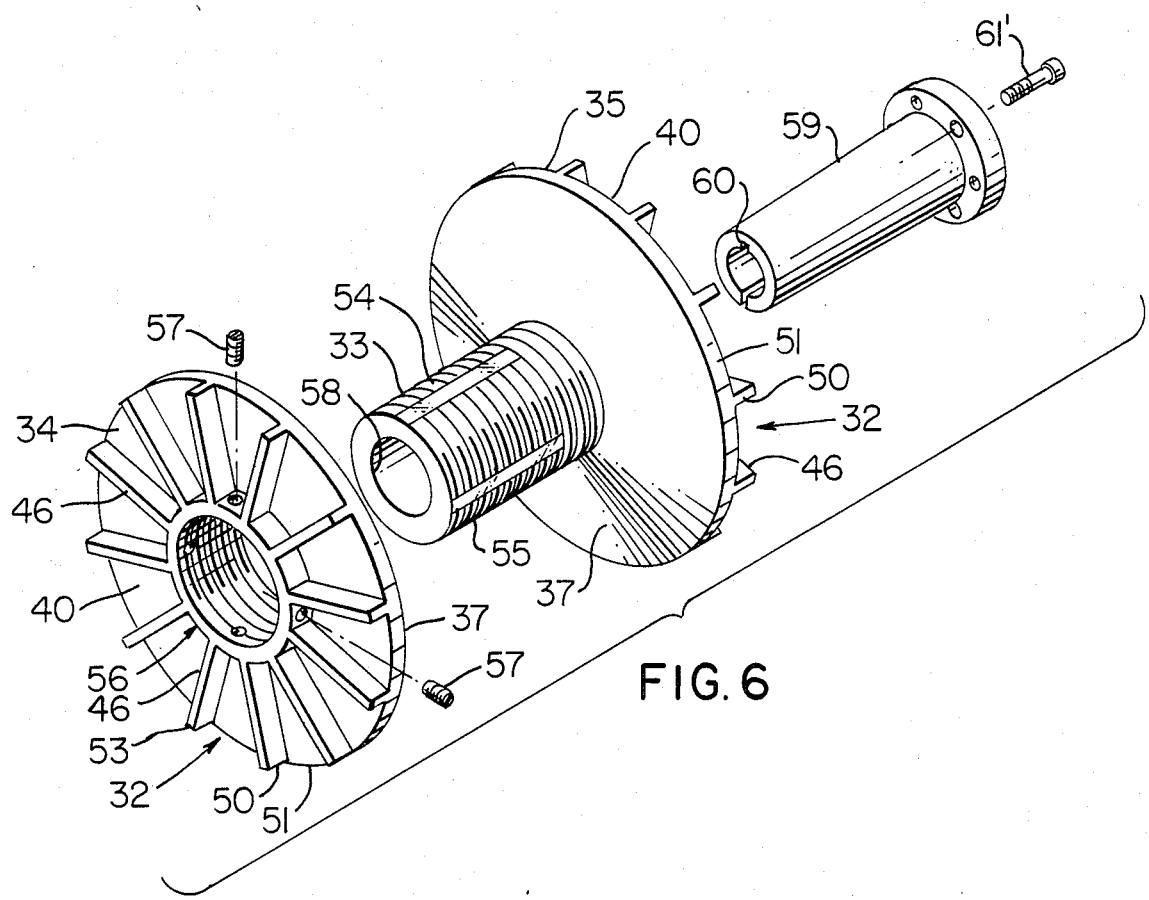
FIG. 6 is an exploded perspective view of the various parts of the pulley of FIGS. 3-5.

The vanes 46 of the pulley 22 each has an outer end edge 50 that is disposed substantially coplanar with the outer peripheral edge 51 of the respective pulley part 34 and 35 as illustrated in FIG. 4, each vane 46 also having an inner edge 52.

The outer peripheral edge 50 of each vane 46 of the pulley 22 joins with the outer edge 49 thereof at substantially a right angle to define a substantially right angle corner 53 at the outer peripheral portion 48 of the respective vane 46 as illustrated in the drawings, the inner edge 52 of each vane 46 of the pulley part 35 also joining with its respective outer edge 49 at substantially a right angle to define a substantially right angle corner 53'.

The pulley part 35 has a hub portion 54 that extends longitudinally therefrom and is provided with a plurality of external threads 55 on which an internally threaded hub portion 56 of the other pulley part 34 can be threaded as illustrated in FIG. 4 to define the peripheral groove 36 of the desired width. Once the desired width of the peripheral groove 36 has been determined by the relative rotation between the pulley parts 34 and 35, the pulley part 34 can be fastened to the hub portion 54 of the pulley part 35 by suitable set screws 57 as illustrated, the hub portions 54 and 56 of the respective parts 35 and 34 defining part of the hub 33 of the pulley 22.

The hub portion 54 of the pulley part 35 can be integral and one-piece therewith and have a central bore 58 extending therethrough. If desired, a suitable shaft bushing 59 can be disposed in the bore 58 of the hub portion 54 to define another portion of the hub 33 of the pulley 22 as well as provide a suitable keyway 60, FIG. 6, for splining the hub portion 33 of the pulley 22 to a suitable shaft that is to drive the pulley 22 to be driven thereby as the case may be in a manner well known in the art, the hub part 59 being adapted to be fastened directly to the pulley part 35 by threaded fastening members 61' as illustrated in the drawings.

While the pulley 22 of this invention has been previously described as having an adjustable hub portion 33 for determing the width of the peripheral groove 36 between the pulley parts 34 and 35, it is to be understood that the pulley 22 could have the parts 34 and 35 initially fixed relative to each other in any other conventional manner.

From the above, it can be seen that the belt pulley 22 of this invention can be made by the method of this invention in a relatively simple manner to operate in a manner now to be described.

Figure 3:
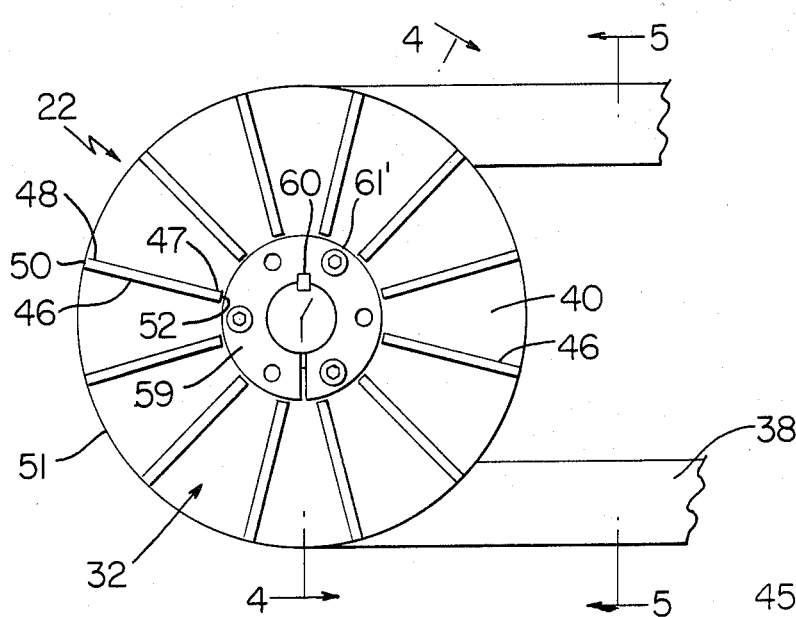
FIG. 3 is an enlarged fragmentary side view of the pulley of this invention that is utilized in FIGS. 1 and 2.
Figure 5:
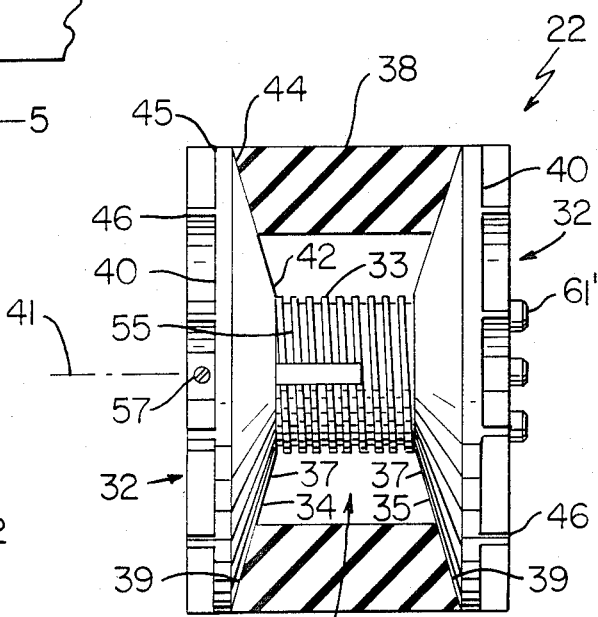
FIG. 5 is a cross-sectional view taken substantially on line 5—5 of FIG. 3.

Assuming that the pulley 22 is being driven by the belt 38 so as to be rotated about the axis 41 of the hub 33 in a conventional manner, the rotation of the pulley 22 causes the vanes or fins 46 to act on the air adjacent the pulley 22 to tend to force the air between the vanes 46 radially outwardly between the vanes 46 through a centrifugal action which tends to draw fresh fluid at the inner peripheral portions 47 of the vanes 46 to be pumped radially outwardly by the vanes 46 over the surface of the vanes 46 and the outboard surfaces 40 of the pulley 22. The rotating vanes 46 also cause a turbulence in the air flow as such air is flowing radially outwardly over the surfaces 40 of the pulley 22 as well as over the surfaces of the vanes 46 to tend to cool the vanes 46 and surfaces 40 of the pulley 22, and, thus, cool the entire pulley 22 as well as the engaging belt 38 through conduction. In addition, the air leaving the outer peripheral portion 48 of the vanes 46 as well as between the same tends to engage against the adjacent span of the belt 38 as illustrated in FIG. 3 to tend to directly cool the belt 38.

While the pulley 22 previously described has been illustrated in FIGS. 1 and 2 as providing a cooling effect on a conventional engine belt that is utilized to drive accessories of an engine, it is to be understood as previously stated that the pulley 22 of this invention can be utilized in various high-ratio or high-load drives, such as vehicle drives known as continuously variable transmissions because it is believed that the cooling effect of the unique vanes 46 of this invention will extend the life of the belt being utilized therewith.

Also, it is believed that the surfaces 37 of the pulley 22, as well as similar surfaces of the other pulleys of this invention, can be abrasive surfaces, such as by having abrasive means thereon (not shown) to grind the surfaces 39 of the belt 38 to achieve tolerances on the belt in the manner of a conventional grind pulley and the vanes 46 will remove the heat generated by such grinding action in the manner previously described in order to tend to prevent the heat generated through grinding from damaging the belt.

While the pulley 22 of this invention has been previously described as having the vanes 46 being integral and one-piece with the respective outboard surface or side 40 of the pulley 22, it is to be understood that the vanes of this invention can comprise separate parts from the pulley portion 23 and be subsequently secured thereto in any suitable manner whereby the vanes 46 can be formed of materials different from the respective pulley part 34 or 35 so as to provide the desired combination of materials that will best propagate the heat being generated.

Figure 7:
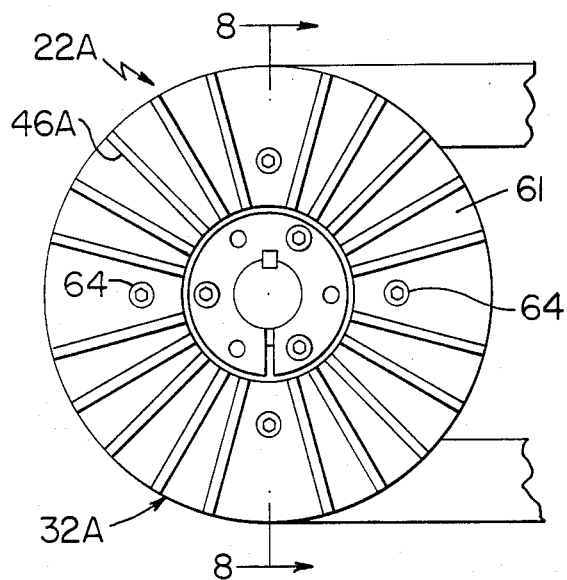
FIG. 7 is a view similar to FIG. 3 and illustrates another belt pulley of this invention.
Figure 8:
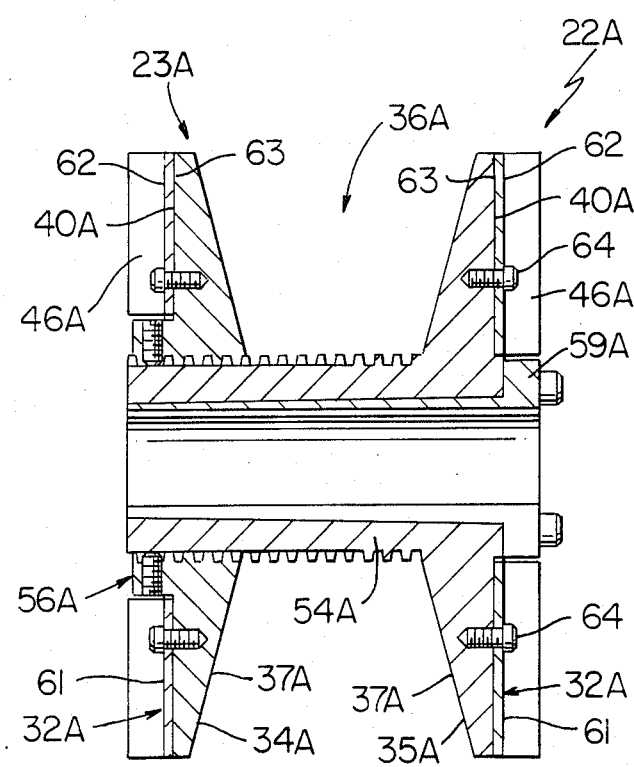
FIG. 8 is a cross-sectional view taken on line 8—8 of FIG. 7.
Figure 9:
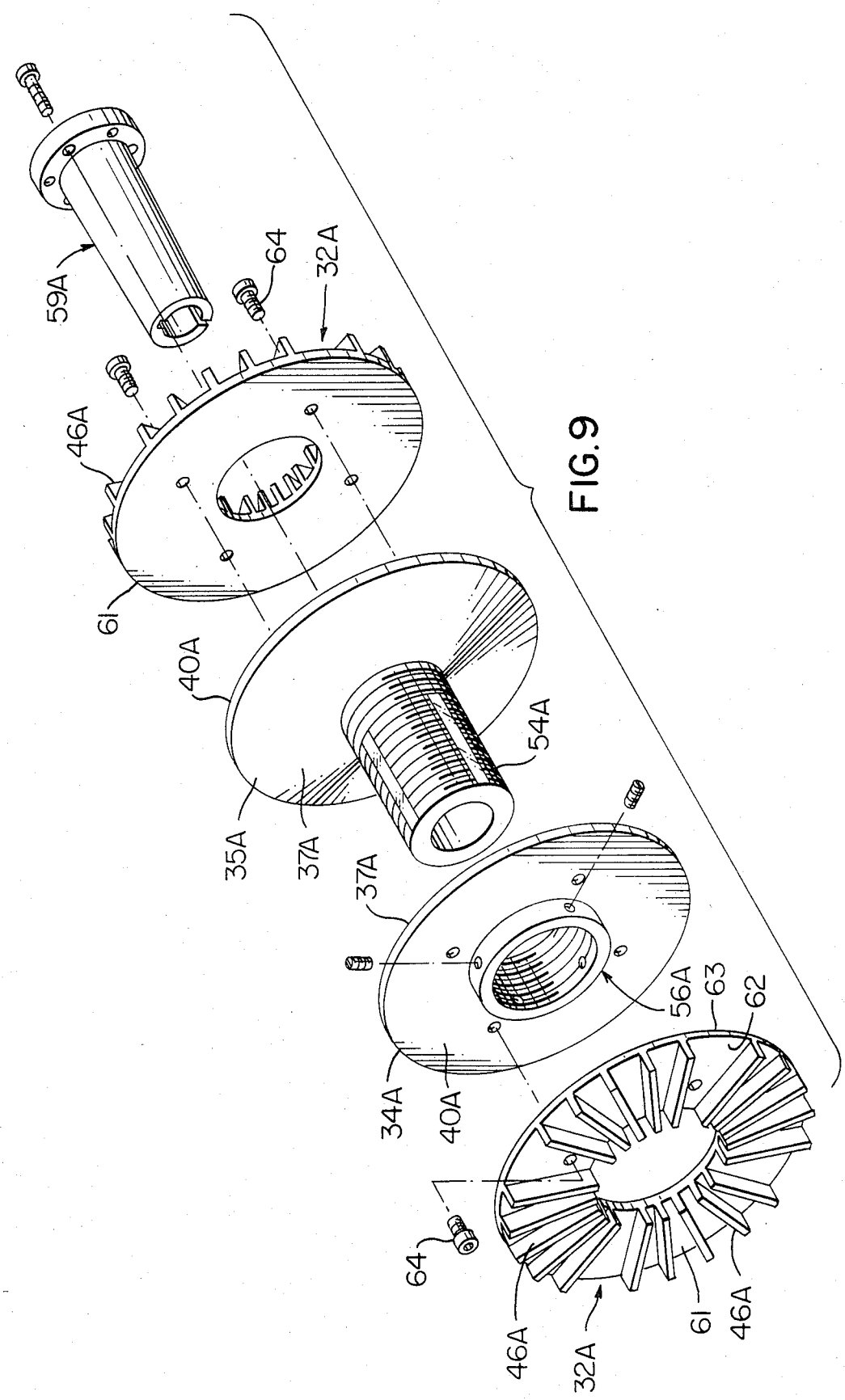
FIG. 9 is an exploded perspective view of the various parts of the belt pulley of FIGS. 7 and 8.

For example, such a belt pulley of this invention is generally indicated by the reference numeral 22A in FIGS. 7-9 and parts thereof similar to the pulley 22 previously described are indicated by the like reference numerals followed by the reference letter "A".

As illustrated in FIGS. 7-9, the pulley 22A has the conventional pulley portion 23A thereof formed in the same manner as the pulley portion 23 of the pulley 22 previously described wherein the pulley parts 34A and 35A respectively have the facing sides 37A defining the peripheral groove 36A therebetween and the outboard facing sides 40A to which the vane means 32A of this invention are secured in a manner hereinafter set forth, the pulley parts 34A and 35A defining the hub portion 33A with the hub portions 54A and 56A and adaptor 59A in the manner previously described.

The vane means 32A for each pulley part 34A or 35A comprises a plurality of circumferentially spaced apart and radially disposed substantially straight vanes 46A of the configuration previously described except that the vanes 46A are carried by substantially flat plate 61 that has opposed flat sides 62 and 63, the vanes 46 being integral and one-piece with the respective plate 61 or being separate therefrom are fastened thereto in any suitable manner.

The plates 61 are secured to the respective sides 40A of the parts 34A and 35A in any suitable manner, such as by the fastening members 64 illustrated in the drawings whereby the flat sides 63 of the plates 61 are respectively disposed in intimate contact with the flat sides 40A of the parts 34A and 35A.

However, if desired, suitable heat transfer means (not shown) can be disposed between the surfaces 63 of the plates 61 and the sides 40A of the parts 34A and 35A to enhance the heat transfer therebetween, such heat transfer means comprising a highly conductive polymeric material as is well known in the art so as to also provide intimate contact between the engaging sides 63 and 40A throughout substantially the entire surfaces thereof.

Therefore, it can be seen that the pulley 22A of this invention can have the vane means 32A thereof be formed separately from the main pulley portion 23A thereof with the vane means 32A being readily secured thereto by the method of this invention to perform the cooling function in the same manner as the vanes 46 previously described whereby the operation of the pulley 22A is substantially the same as the pulley 22 previously described.

While the pulleys 22 and 22A previously described respectively have flat outboard sides 40 and 40A on the pulley parts thereof, it is to be understood that the outboard sides could be of any other suitable configuration while the vanes of this invention can still have the outer edges thereof disposed substantially transverse to the axis of the hub of their respective pulley.

Figure 10:
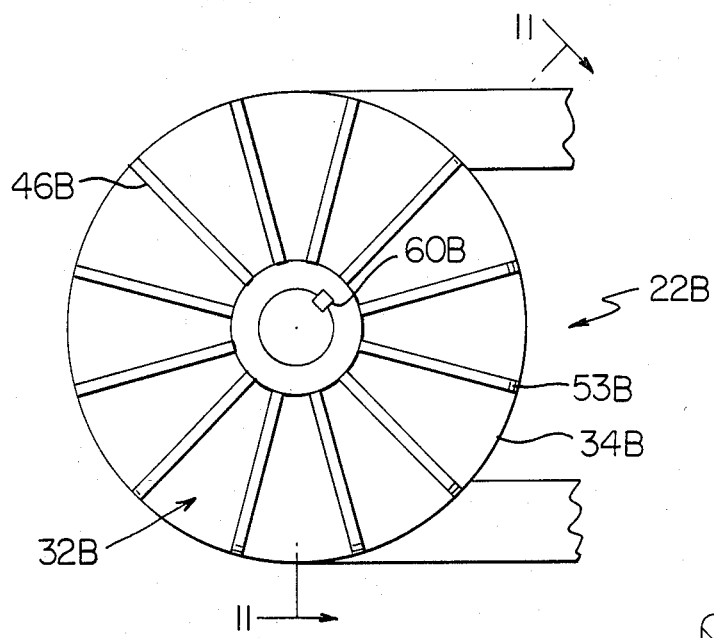
FIG. 10 is a view similar to FIG. 3 and illustrates another belt pulley of this invention.
Figure 11:
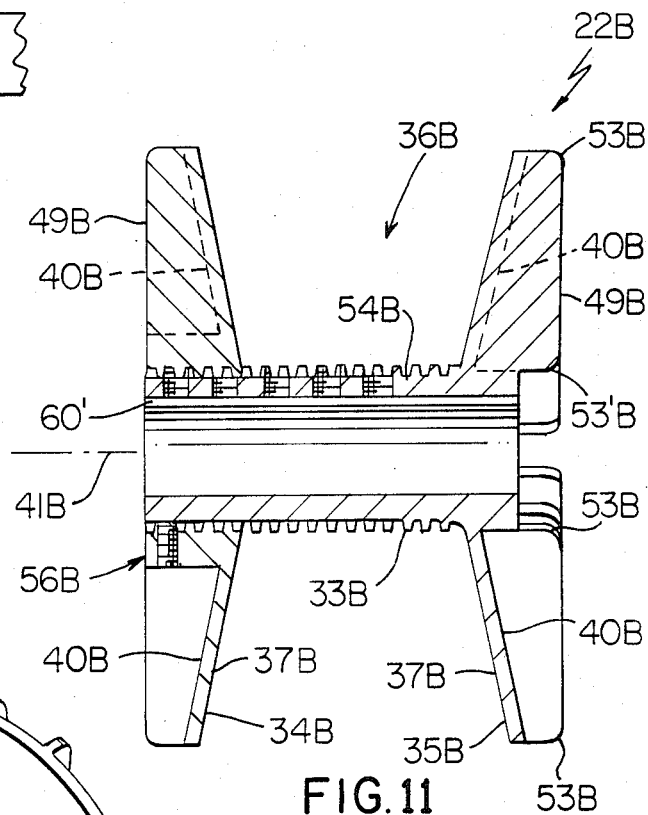
FIG. 11 is a cross-sectional view taken on line 11—11 of FIG. 10.
Figure 12:
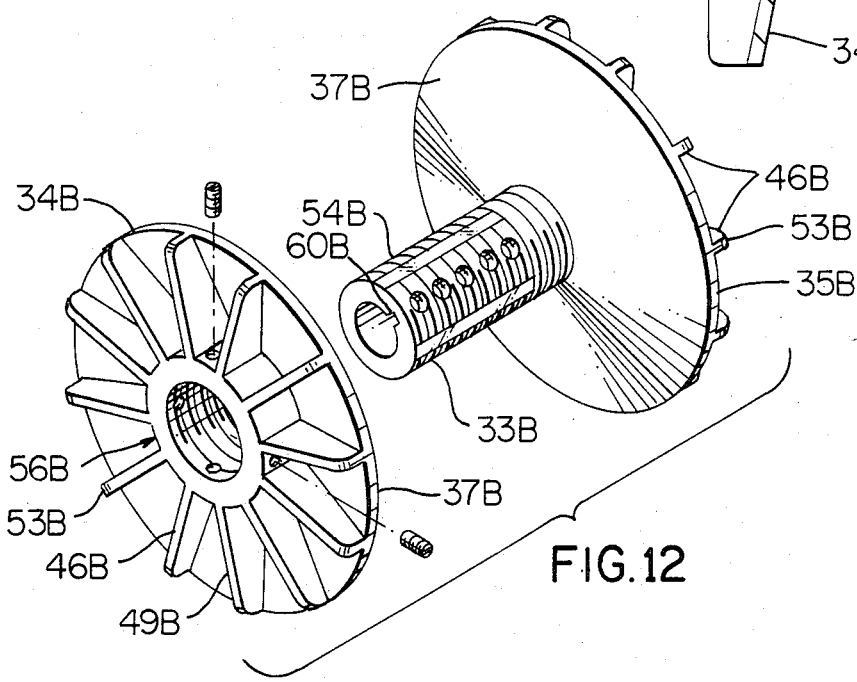
FIG. 12 is an exploded perspective view of the various parts of the belt pulley of FIGS. 10 and 11.

For example, another belt pulley of this invention is generally indicated by the reference numeral 22B in FIGS. 10–12 and parts thereof similar to the pulleys 22 and 22A are indicated by like reference numerals followed by the reference letter "B".

As illustrated in FIGS. 10–12, the pulley parts 34B and 35B respectively have the facing sides 37B defining the peripheral groove 36B therebetween in the manner previously described, the pulley part 35B having the integral hub portion 54B defining the hub 33B of the pulley 22B with the hub portion 56B of the pulley part 34B in the manner previously described. However, the hub portion 54B of the pulley 35B can be provided with the key-way 60B and thereby not require the adapter 59 or 59A previously described in order to be splined to a suitable driven or driving shaft as the case may be.

The outboard sides 40B of the parts 34B and 35B of the pulley 22B are disposed at an inclined angle relative to the axis 41B of the hub 33B and in the embodiment illustrated in FIGS. 10–12, the sides 40B are disposed at the same inclined angle as the inboard sides 37B as illustrated whereby the sides 37B and 40B of each pulley part 34B or 35B are substantially parallel to each other.

However, the vanes 46B are illustrated as being integral and one-piece with the respective sides 40B and respectively have the outer edges 49B thereof disposed substantially transverse to the axis 41B of the hub 33B of the pulley 22B.

The outer peripheral corners 53B of each vane 46B can be rounded as illustrated rather than be a right angled corner as in the vanes 46 and 46A previously described. In addition, the inner corners 53'B of each vane 46B of the pulley part 35B can be rounded as illustrated in FIG. 11 where the same are disposed outboard of the hub portion 54B, the vanes 46B of the pulley part 34B joining the cylindrical hub part 56B that is threadedly disposed on the threaded hub part 54B of the part 35B as illustrated in the same manner as the vanes 46 of the pulley part 34.

Therefore, it can be seen that the pulley 22B of this invention can be formed by the method of this invention as previously described to operate in substantially the same manner as the pulley 22 previously described as the vanes 46B perform a cooling function for the pulley 22B, as well as for the belt thereof, in the manner previously described.

Figure 13:
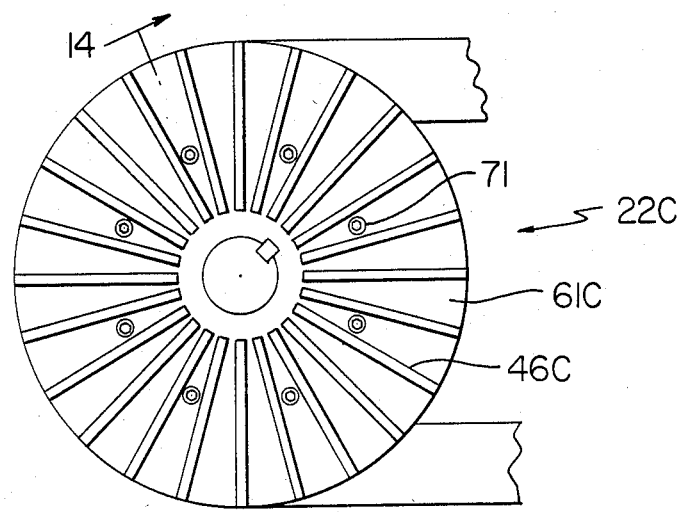
FIG. 13 is a view similar to FIG. 3 and illustrates another belt pulley of this invention.
Figure 15:
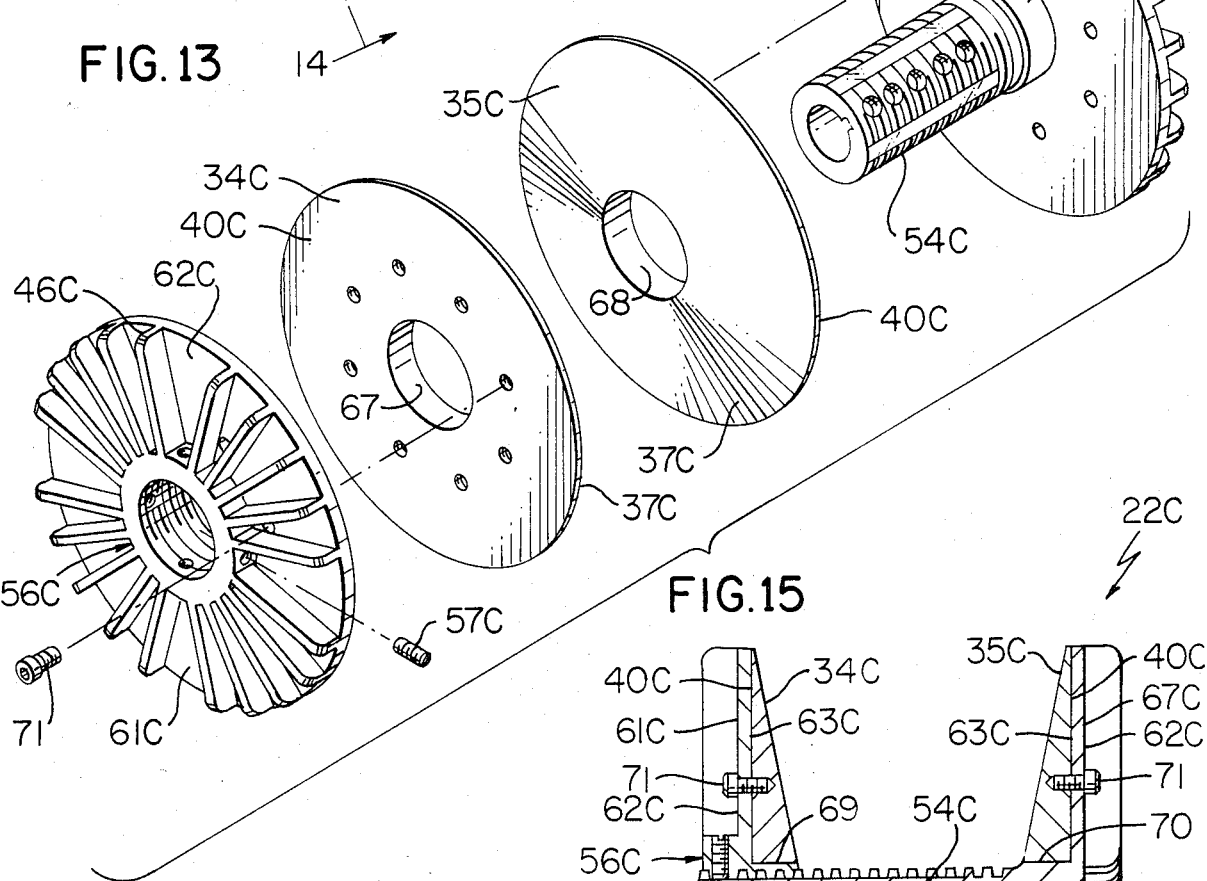
FIG. 15 is an exploded perspective view of the various parts of the belt pulley of FIGS. 13 and 14.
Figure 14:
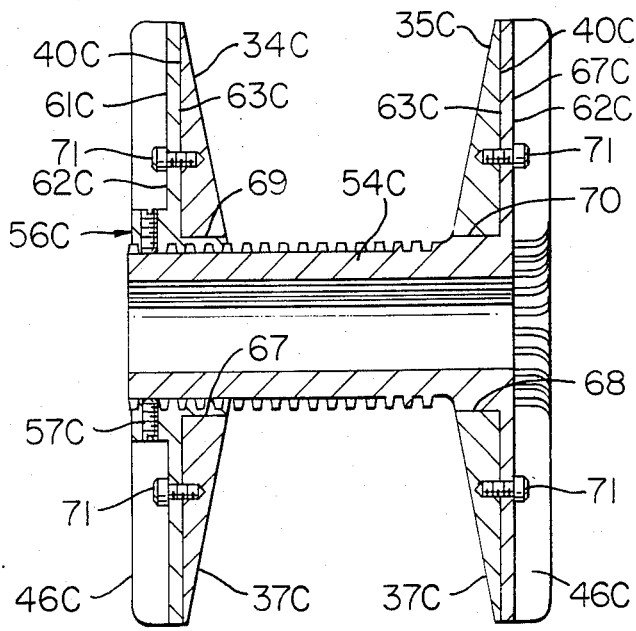
FIG. 14 is a cross-sectional view taken on lines 14—14 of FIG. 13.

Another belt pulley of this invention is generally indicated by the reference numeral 22C in FIGS. 13–15 and parts thereof similar to the pulleys 22, 22A and 22B previously described are indicated by like reference numerals followed by the reference letter "C".

The pulley 22C as illustrated in FIGS. 13–15 is substantially the same as the pulley 22A of FIGS. 7–9 except that the hub part 54C is carried by one of the plates 61C and not by the pulley part 35C as in the pulley 22A. In addition, the other plate 61C of the pulley 22C has the hub portion 56C thereon that is internally threaded to be threaded onto the hub part 54C to be fastened thereto by the set screws 57C in the manner previously described.

The pulley parts 34C and 35C of the pulley 22C respectively have the opposed facing sides 37C and outboard flat sides 40C previously described, the parts 34C and 35C respectively having central openings 67 and 68 passing therethrough to permit the same to be respectively journaled on cylindrical portions 69 and 70 of the respective hub portion 56C and 54C as illustrated in FIG. 14 so that the flat sides 40C thereof will be disposed in intimate contact with the flat sides 63C of the plates 61C while being fastened thereto by the fastening means 71 as illustrated.

If desired, suitable heat transfer means (not shown) can be disposed between the adjacent sides 40C of the pulley parts 34C and 35C and the respective sides 62C of the plates 61C in the same manner and for the same purpose as the pulley 22A previously described.

The vanes 46C of the plates 61C are substantially the same configuration as the vanes 46B of the pulley 22B previously described and perform the cooling function in substantially the same manner as the vanes 46 previously described so that the operation of the pulley 22C need not be set forth.

However, it can be seen that the pulley 22C of this invention can be formed in a relatively simple manner according to the method of this invention as previously set forth to operate in a manner to provide a cooling function for the pulley 22C as well as for the belt being utilized therewith as previously described.

Therefore, it can be seen that this invention not only provides improved belt pulleys, but also this invention provides improved methods of making such improved belt pulleys.

While the forms and methods of this invention now preferred have been illustrated and described as required by the Patent Statute, it is to be understood that other forms and method steps can be utilized and still fall within the scope of the appended claims.

What is claimed is:

1. In a belt pulley having a hub and a peripheral groove for receiving part of an endless belt therein that is to drive said pulley or be driven thereby whereby said pulley is adapted to be rotated about a longitudinal axis of said hub, said pulley having a pair of opposed facing sides defining at least part of said groove therebetween and having a pair of oppositely facing outboard sides, said sides each having an inner peripheral portion and an outer peripheral portion, said pulley having a plurality of circumferentially spaced apart and radially disposed substantially straight vanes extending outwardly from said outboard sides thereof, each said vane having an inner peripheral end and an outer peripheral end respectively disposed adjacent said inner peripheral portion and said outer peripheral portion of its respective outboard side and having an outer edge that is disposed substantially transverse to said longitudinal axis of said hub from substantially said inner peripheral end thereof to said outer peripheral end thereof and is spaced outwardly from said respective outboard side from substantially said inner peripheral end thereof to said outer peripheral end thereof whereby said vanes are adapted to act on fluid adjacent said pulley to tend to cool said pulley with said fluid, the improvement comprising a pair of plate means respectively carrying said vanes for said outboard sides of said pulley and being respectively secured to said outboard sides of said pulley to rotate in unison therewith, each said plate means having part of said hub carried thereby and being secured to said part of said hub of the other plate means whereby said parts define said hub of said pulley.

2. A belt pulley as set forth in claim 1 wherein each said vane has an outer peripheral end edge that is substantially straight and parallel to said longitudinal axis of said hub.

3. A belt pulley as set forth in claim 2 wherein each said vane has said outer peripheral end edge thereof join its respective outer edge thereof substantially at a right angle relative thereto whereby the resulting outer corner of the respective vane is right angled.

4. A belt pulley as set forth in claim 2 wherein each said vane has said outer peripheral end edge thereof join its respective outer edge thereof with an arcuate portion thereof whereby the resulting outer corner of the respective vane is rounded.

5. A belt pulley as set forth in claim 2 wherein each outboard side of said pulley has an outer peripheral end edge that is substantially straight and parallel to said longitudinal axis of said hub, each said vane having said outer peripheral end edge thereof disposed substantially coplanar with said outer end edge of its respective outboard side of said pulley.

6. A belt pulley as set forth in claim 1 wherein each said outboard side of said pulley has an outer surface that is substantially flat and is disposed substantially transverse to said longitudinal axis of said hub.

7. A belt pulley as set forth in claim 1 wherein each said plate means has an inner surface that is substantially flat and is disposed against said flat surface of its respective outboard side of said pulley.

8. A belt pulley as set forth in claim 1 wherein each said plate means is integral and one-piece with its respective vanes.

9. A belt pulley as set forth in claim 1 and including heat transfer means disposed between each said plate means and its respective outboard side of said pulley.

10. A belt pulley as set forth in claim 1 wherein each said plate means has its respective part of said hub integral and one-piece therewith.

* * * * *